United States Patent

[11] 3,628,261

[72] Inventor Robert I. Thompson
7444 St. Charles Ave. Apt. 3F, New Orleans, La. 70118
[21] Appl. No. 8,183
[22] Filed Feb. 3, 1970
[45] Patented Dec. 21, 1971

[54] EDUCATIONAL TOY DEVICE
4 Claims, 7 Drawing Figs.

[52] U.S. Cl. ........................................ 35/70, 46/1 R, 46/25, 273/155
[51] Int. Cl. ........................................ A63h 33/04
[50] Field of Search ........................................ 35/69, 70, 71, 31 G; 46/1 R, 26; 273/155, 156, 153 R

[56] References Cited
UNITED STATES PATENTS

| | | | |
|---|---|---|---|
| 1,568,576 | 1/1926 | Stout | 273/153 R X |
| 2,809,467 | 10/1957 | Pierre | 46/1 R |
| 3,189,350 | 6/1965 | Hopkins | 273/153 R |
| 3,487,578 | 1/1970 | Sudermann | 46/1 R |

FOREIGN PATENTS

| | | | |
|---|---|---|---|
| 141,906 | 1/1935 | Austria | 273/146 |

Primary Examiner—Harland S. Skogquist
Attorney—Watson, Cole, Grindle & Watson

ABSTRACT: An educational toy device comprising multiple groups of cubes wherein each group is interconnected by means of a double hinge and each cube in each group is also connected by means of a double hinge thereby permitting any number of cube combinations for forming various configurations. Each of the cubes in each group is provided with a selected numeral on each of its six faces in a manner whereby the numerical sum on the faces of at least any pair of cubes adjacent another pair along a common line of symmetry is the same regardless of the various cube combinations.

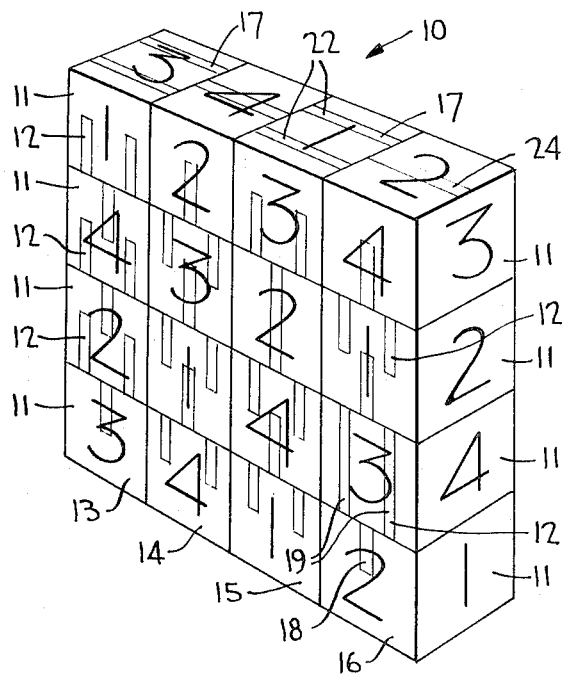
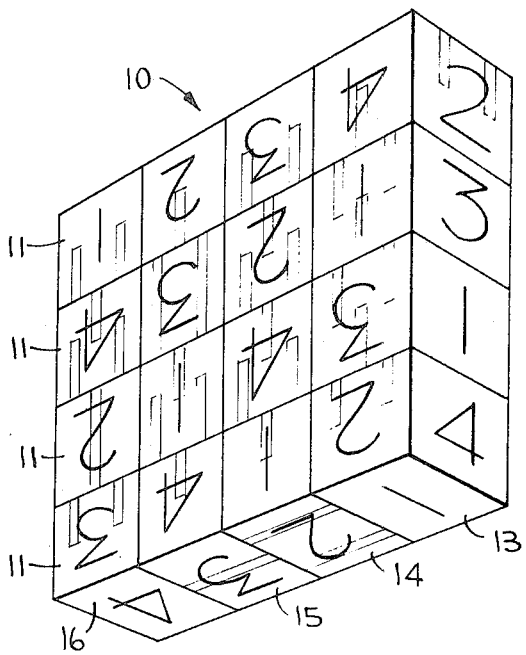
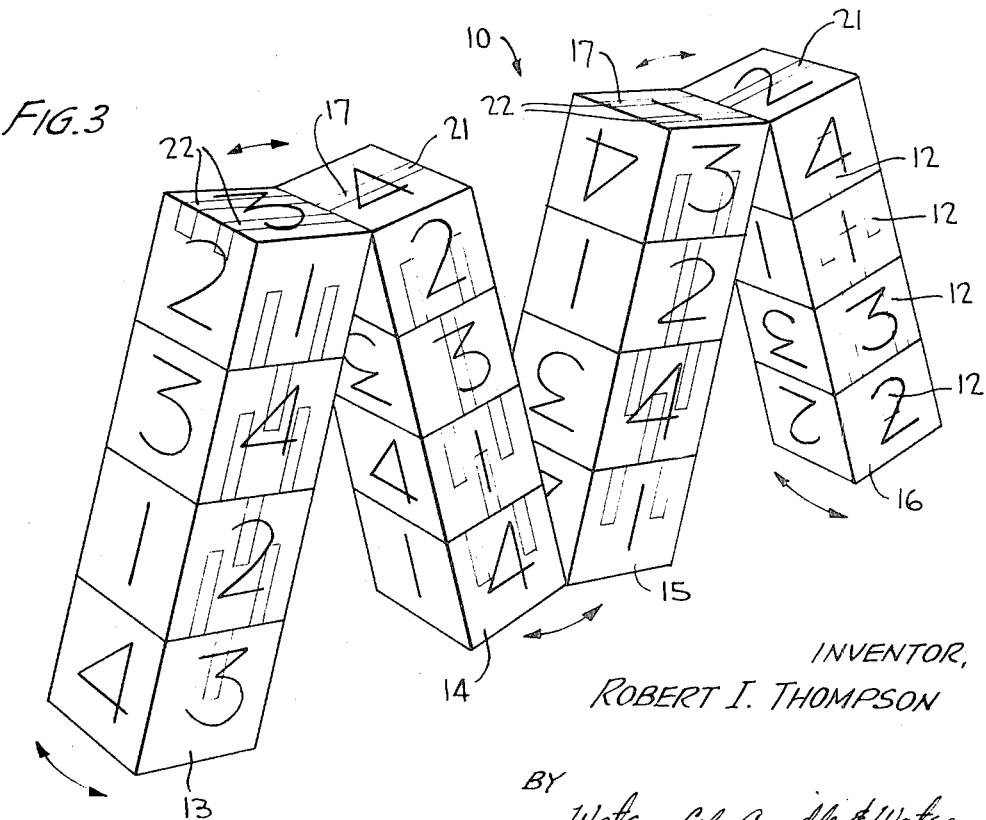
INVENTOR,
ROBERT I. THOMPSON
BY
Watson, Cole, Grindle & Watson
ATTORNEYS

INVENTOR,
ROBERT I. THOMPSON 3,628,261

EDUCATIONAL TOY DEVICE

This application relates generally to educational toy devices and more particularly to a multiple-cube device wherein each face on each cube is provided with a selected numeral and wherein each of the cubes are so interconnected as to be combined into any number of cube configurations, the numerical total on the faces of at least any pair of said cubes adjacent each other along a common plane of symmetry being the same regardless of the various cube configurations.

Cube devices have always fascinated young children and, because of their multisided configuration, readily lend themselves for use as building blocks or as an educational device after a number of words, pictures, or numerals are placed on one or more of its faces. It is, therefore, an object to make use of a multiplicity of such cubes and to interconnect them in such a way and provide a numeral on each of the cube faces in such a manner so that the device may be used as both a toy and an educational device whereby the child's interest is maintained during simple arithmetic exercises.

Another object of the invention is to provide an educational cube device wherein a plurality of cubes are provided each being interconnected to one another by means of a double hinge and each being provided with a selected numeral on each of its six faces so that regardless of the many cube configurations which may be formed of the plurality of cubes the numerical total on the faces of at least any pair of the cubes adjacent to another pair along a common plane of symmetry is always the same regardless of the various cube configurations.

A further object of the present invention is to provide an educational toy device as described wherein the interconnected cubes are arranged to form a plurality of groups, the double hinges between groups permitting movement in one plane and the double hinges between cubes in each group permitting movement in another plane perpendicular to the one plane whereby a large variety of cube configurations is permissible.

A still further object of the instant invention is to provide an educational toy device as characterized wherein the double hinges between cube groups are located at alternate ends of adjacent groups for pivotal movement between groups in one plane perpendicular to the pivotal movement between cubes in each group in another plane.

A still further object of the present invention is to provide an educational toy device as characterized wherein four of such groups is provided each having four cubes and each cube face being provided with a numeral from 1 to 4 so that regardless of the various cube configurations the numerical total on the faces of at least any pair of the cubes adjacent another pair along a common plane of symmetry is always equal to 10.

A still further object of the instant invention is to provide an educational toy device as described wherein the plurality of cubes are capable of forming a 4×4×1 device wherein the numerical total on the faces of the cubes lying along each of the four diagonals of the device is also equal to 10.

Other objects, advantages and novel features of the present invention will become apparent from the following detailed description of the invention when considered in conjunction with the accompanying drawings wherein:

FIG. 1 is a front perspective view of the educational toy device according to the present invention;

FIG. 2 is a rear perspective view of the device according to the present invention;

FIG. 3 is a front perspective view similar to FIG. 1 except that each of the cube groups is shown after being slightly pivoted away from one another;

Figure 4:
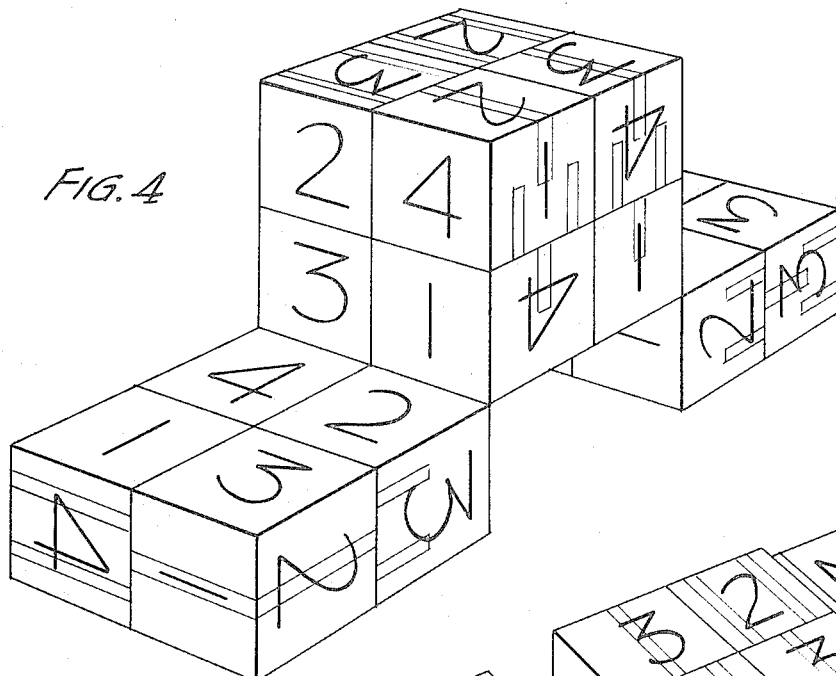
FIGS. 4 and 5 are, respectively, perspective views showing two possible configurations of the cubes.
Figure 5:
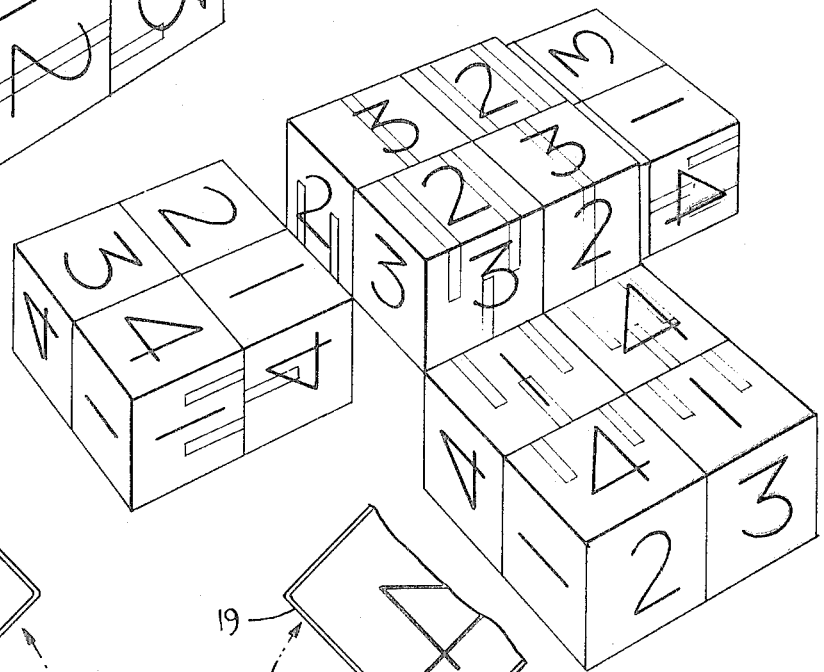
Figure 6:
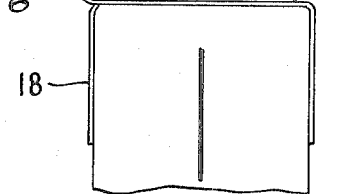
FIGS. 6 and 7 are side views showing a typical double movement permitted by each of the double hinges between a pair of the cubes.
Figure 7:
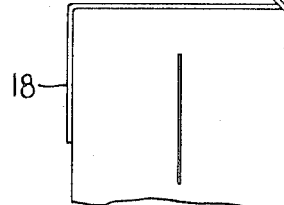

Turning now to the drawings wherein like reference characters refer to like in corresponding parts throughout the several views, there is shown in FIGS. 1 and 2 a front and back perspective view, respectively, of the educational toy device 10 according to the present invention. As can be seen, a plurality of cubes 11 is provided each having a selected numeral on each of its six faces between 1 and 4 and each being interconnected by means of a double hinge 12 between each of the cubes located in each of the cube groups 13, 14, 15 and 16. Each of the cube groups is also interconnected by means of a double hinge 17 at alternate ends of each pair of cube groups so that the tops of groups 13 and 14 and of groups 15 and 16 are interconnected by means of the double hinge 17 and the bottoms of the groups 14 and 15 are also similarly interconnected. With reference to FIGS. 6 and 7, it is to be noted that each of the double hinges 12 between each of the cubes in each group is shown to be typically comprised of a first hinge strip 18 extending between the lower right edge of face 4 and the upper left side edge of face 1 on the adjacent block. A pair of second hinge strips 19 comprise the remainder of the double hinge 12 and extend between the lower left edge of the face 4 and the upper right edge of face 1 on the adjacent block. Of course, each of the first hinge strips 18 is disposed between the pair of second hinge strips 19 which are spaced a suitable distance from each other as clearly seen in FIG. 1, for example. Such an arrangement of first and second hinge strips is intended for each of the double hinges 12 between each of the cubes in each group so that it is to be understood that a similar arrangement of first and second hinge strips is intended for such cubes as is evident from FIGS. 1-5 of the drawings. Similarly, the double hinge 17 comprises a single third hinge strip 21 extending along the face two of the uppermost block in group 16, downwardly over its upper left side edge, and terminating on the right side face of its adjacent uppermost block in group 15. A pair of fourth hinge strips 22 of the double hinge 17 extend across the upper face one of the uppermost block in group 15, downwardly over its upper left side edge, and terminating on the left side face of the uppermost block in group 16. Such a double hinge 17 is intended to be typical for each of the remaining double hinges between the tops of groups 13 and 14 and between the bottoms of groups 14 and 15. Double hinges 12 and 17 are generally of the type which have been heretofore devised in the game and toy art so that as such they form no part of this invention except for their use in combination as an educational toy device.

With reference to FIG. 3, it will be seen that the double hinges 12 permit each of the cubes in each of the groups 13 through 16 to pivot in the directions shown by the double arrows and, more specifically in FIGS. 6 and 7, as shown by the arrows between the adjacent blocks. Similarly, the double hinges 17 permit adjacent cube groups to pivot in a dual direction as shown by the double arrows. With the double hinges 12 and 17 so placed it can be seen that the educational toy device of the present invention is capable of being arranged so that its cubes form any number of combinations, two of such combinations being shown in each of the FIGS. 4 and 5.

The numerals for each of the six faces of each cube are so selected that the numerical total on any four cubes adjacent one another in a vertical or horizontal direction, or diagonally across the front and back of the device as shown in FIGS. 1 and 2 or as a rectangular cluster of four cubes, will always be equal to 10. It can be therefore seen that a common plane of symmetry exists for such groups of four cubes (with the exception of the diagonal groups) so that with any such common plane of symmetry for any pair of cubes adjacent another pair therealong the numerical total on each of the four such faces will be always equal to 10. With such an educational toy device, the child will be not only sufficiently occupied while attempting to achieve some desired configuration for the interconnected cubes but will at the same time be conducting an arithmetic exercise because he will have been told that with any four adjacent cubes along a vertical, horizontal, diagonal or in a rectangular cluster, he will be able to add up the numerals on such on the faces of these cubes and always come up with a total of 10. It has been found among children that many slow learners in arithmetic have greatly improved upon their learning ability with the use of such a device simply because of the challenge that the device presents in terms of the various configurations possible and the competition with other children in striving for new and different combinations while at the same time repeating their exercises in simple arithmetic in constantly adding up four numerals equal to 10.

Obviously many modifications and variations of the present invention are possible in the light of the above teachings. For example, different numerals for different numerical totals and more or fewer blocks and groups as that disclosed are possible without departing from the spirit of the invention. It is, therefore, to be understood that within the scope of the appended claims the invention may be practiced otherwise than as specifically described.

What is claimed is:

1. An educational toy device comprising a plurality of cubes arranged into a plurality of cube groups, a double hinge interconnecting adjacent pairs of said cubes in each said group and further interconnecting adjacent pairs of said cube groups, said cube double hinges being so arranged as to permit each of said cubes in each said group to pivot in a first plane along each of a pair of cube first edges, said cube group double hinges being so arranged as to permit each of aid cube groups to pivot in a second plane perpendicular to said first plane along each of a pair of second cube edges, and each face of each said cube being provided with a selected numeral thereon of one of four different numerals in a manner whereby the numerical total on the faces of at least any pair of said cubes adjacent another pair along a common plane of symmetry is the same regardless of the relative position of said faces of each cube to each other in one group or in other ones of said groups.

2. The device according to claim 1 wherein four of said groups is provided, each said group having four cubes and said faces of each cube having a numeral between 1 and 4 wherein said numerical total equals 10.

3. The device according to claim 2 wherein the numerical total on the faces of said cubes lying along a diagonal across said cube groups is also equal to 10.

4. The device according to claim 3 wherein each said double hinges for said cubes in each said group comprises a first hinge strip and a pair of second hinge strips each, extending between alternate ones of said pair of cube first edges on adjacent cubes, and wherein each of said double hinges for said cube groups are located at alternate ends of each pair of adjacent groups, said cube group hinges comprising a third hinge strip and a pair of fourth hinge strips each extending between alternate ones of said pair of cube second edges in adjacent groups, whereby each of said cubes and each of said cube groups may be pivoted in each of two directions in their respective first and second planes.

* * * * *